No. 699,701. Patented May 13, 1902.
B. NOVIN.
RATCHET DRILL STOCK AND SCREW DRIVER.
(Application filed Feb. 13, 1902.)
(No Model.)
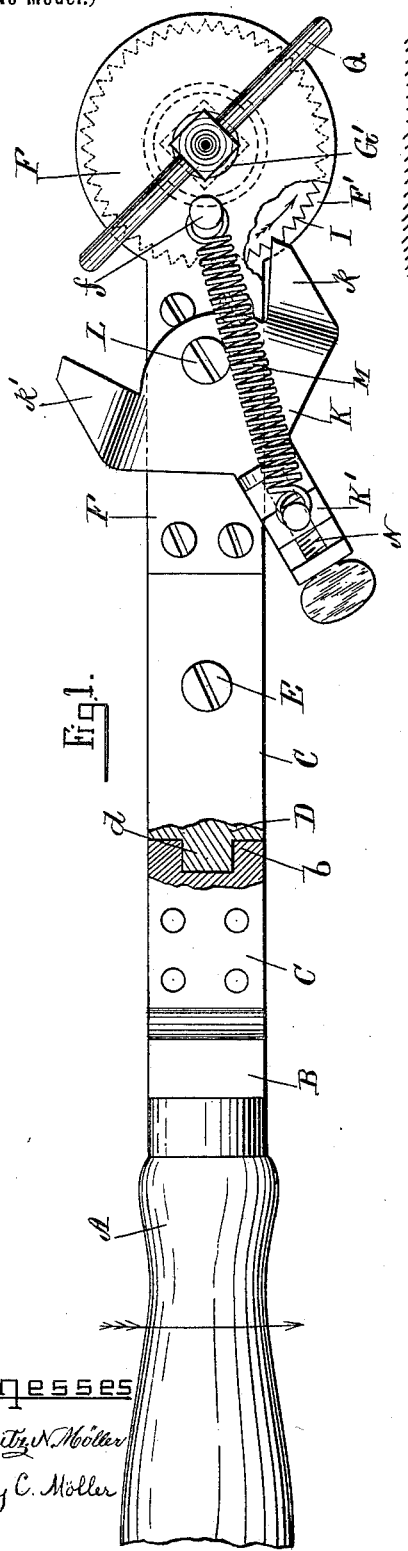
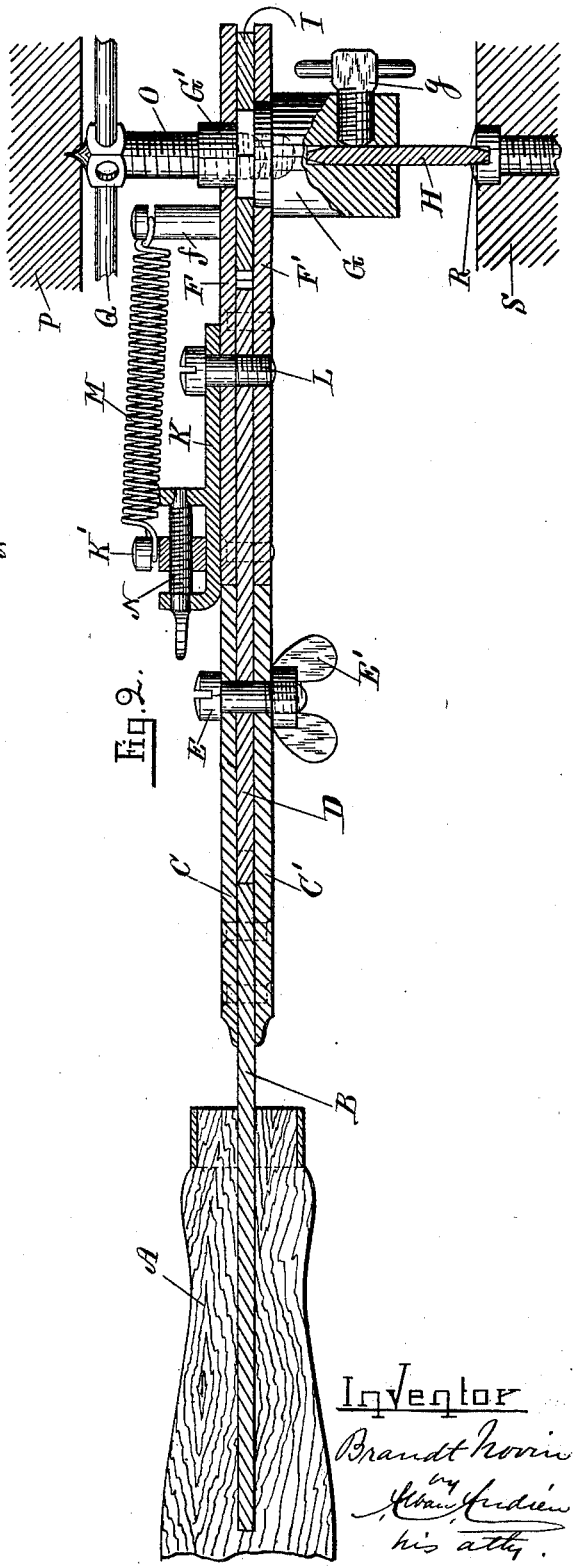
Fig. 1.
Fig. 2.
Witnesses
Lauritz N. Möller
Mary C. Möller
Inventor
Brandt Novin
by
his atty.
THE NORRIS PETERS CO., PHOTO-LITHO., WASHINGTON, D. C.

UNITED STATES PATENT OFFICE.

BRANDT NOVIN, OF CAMBRIDGEPORT, MASSACHUSETTS.

RATCHET-DRILL STOCK AND SCREW-DRIVER.

SPECIFICATION forming part of Letters Patent No. 699,701, dated May 13, 1902.

Application filed February 13, 1902. Serial No. 93,954. (No model.)

*To all whom it may concern:*

Be it known that I, BRANDT NOVIN, a citizen of Sweden, and a resident of Cambridgeport, in the county of Middlesex and State of Massachusetts, have invented certain new and useful Improvements in Ratchet-Drill Stocks and Screw-Drivers, of which the following is a specification.

This invention relates to improvements in ratchet-drill stocks and screw-drivers; and it is carried out as follows, reference being had to the accompanying drawings, wherein—

Figure 1 is a top plan view of the device, parts being shown in section; and Fig. 2 is a longitudinal section of Fig. 1.

Similar letters refer to similar parts wherever they occur on the different parts of the drawings.

In the drawings, A represents the tool-handle, to which is secured in a suitable manner the tongue B, to which is secured a slitted shank, preferably composed of two plates C C', secured to or made integral with the tongue B, as may be desired. To said slitted shank is detachably secured a metal blade D, preferably by means of a headed screw-bolt E, passing loosely through a perforation made in the plates C C' and blade D and provided at its end with a thumb-nut E', by means of which the said blade D may be firmly secured to said plates C C', as shown.

In practice I make on the inner end of the blade D a tooth or projection d, adapted to interlock into a notch or recess b at the outer end of the tongue B, as shown, and by such arrangement and the clamping-bolt E the blade D is firmly secured to the slitted shank C C' and tongue B, so as to make a rigid connection between such parts when so desired.

To opposite sides of the blade D are firmly secured the metal plates F and F', the outer ends of which are preferably made cylindrical, as shown in Fig. 1.

G in Fig. 2 is the tool-holding chuck or socket, having a recess of suitable size or shape into which the screw-driver H or other suitable tool, such as a drill or screw tap, may be inserted and secured, preferably by means of a set-screw or thumb-screw g, as shown in Fig. 2.

G' is the shank of the tool-holder G, and such shank is journaled in cylindrical perforations in the plates F F', as shown in Fig. 2.

In the space between the plates F F' is located a serrated or ratchet wheel I, which is attached to the shank G' and its socket or chuck G in any suitable manner. It will thus be seen that by imparting a rotary motion in either direction to the ratchet-wheel I a corresponding rotary motion is imparted to the chuck or socket G and the tool secured to the same. In connection with said ratchet-wheel I is used a spring-pressed pawl-carrier K, which is pivoted to the plates F F', preferably by means of a pin or screw L. Said pawl-carrier is provided with pawls $k$ and $k'$, adapted to engage with the ratchet-wheel I. M is a coiled spring, one end of which is attached to a pin or projection $f$ on the plate F and having its other end attached in a suitable manner, preferably to an adjustable post or block K', which is capable of adjustment by means of a screw N, passing through a screw-threaded perforation in said post K' and journaled in suitable bearings attached to or forming part of the pawl-carrier K, as shown. By means of such adjustable post K' the tension of the spring M may be regulated as may be desired.

The shank G' of the chuck or socket G is internally screw-threaded, and into it is screwed the feed-screw O, the outer end of which is adapted to rest against a suitable support P during the operation of the device, as shown in Fig. 2. The said feed-screw may be adjusted either by applying a wrench to its head or by means of a pin or rod Q, inserted through a perforation in the head of said screw, as shown in Figs. 1 and 2.

In Fig. 2 I have shown the device as applied for the purpose of a screw-driver to screw a screw R into or out from a screw-threaded perforation in a metal piece S; but the device is of course equally useful for drilling or tapping purposes, as may be desired. By moving the handle A in the direction of the arrow shown in Fig. 1 and by swinging the pawl-carrier K to the position shown in Fig. 1 the ratchet-wheel I and the chuck G are caused to move in the direction of arrow shown in Fig. 1, thus causing the screw R to be unscrewed from the plate or other object S. If it is desired to turn the chuck G in an opposite direction to that shown by the arrow in Fig. 1, it is only necessary to swing the pawl-carrier K to its opposite direction, so as to cause the pawl $k'$ to engage with the ratchet-wheel I, where it will be held by the influence of the spring M. It will thus be seen that by reciprocating the handle A an intermittent rotary motion may be imparted in either direction to the socket or chuck G, as may be required. By adjusting the position of the screw O relative to the screw-threaded shank $G'$ a longitudinal adjustment or feed is imparted to the chuck or socket G in either direction, as may be desired.

What I wish to secure by Letters Patent and claim is—

The herein-described ratchet-drill stock, consisting in combination a tongue or handle B, a slitted extension C, C', attached to or made integral with the part B, a blade D, secured to said slitted extension, a pair of plates F, F', secured to the blade D, a socket G journaled on said plates and having secured to it a ratchet-wheel I, and provided with a feed-screw O, a pawl-carrier K pivoted to said plates and provided with pawls $k$ and $k'$, adapted to be swung into engagement with the ratchet-wheel I and provided with a spring M, for holding either of said pawls in engagement with the ratchet-wheel I, substantially as and for the purpose set forth.

In testimony whereof I have affixed my signature in presence of two witnesses.

BRANDT NOVIN.

Witnesses:
ALBAN ANDRÉN,
CHARLES L. ABBOTT.